United States Patent [19]

Reishus et al.

[11] Patent Number: 4,756,184

[45] Date of Patent: Jul. 12, 1988

[54] APPARATUS AND METHOD FOR SEAL TESTING FLEXIBLE CONTAINERS

[75] Inventors: Terry G. Reishus, Maple Grove; Michael G. Viland, Eden Prairie; Timothy R. Cooley, Bloomington, all of Minn.

[73] Assignee: General Mills, Inc., Minneapolis, Minn.

[21] Appl. No.: 25,250

[22] Filed: Mar. 12, 1987

[51] Int. Cl.[4] ............................................. G01M 3/32
[52] U.S. Cl. ....................................... 73/49.3; 73/45.4
[58] Field of Search ................. 73/49.3, 52, 45.4, 49.2

[56] References Cited

U.S. PATENT DOCUMENTS

| 3,683,677 | 8/1972 | Harris | 73/49.2 |
| 3,751,972 | 8/1973 | Haas | 73/45.4 |
| 3,805,595 | 4/1974 | Dobry | 73/52 X |
| 3,837,215 | 9/1974 | Massage | 73/49.3 X |
| 3,847,014 | 11/1974 | Mistarz | 73/45.4 X |
| 4,148,213 | 4/1979 | Prakken | 73/45.4 |
| 4,510,730 | 4/1985 | Edmondson | 73/49.3 X |
| 4,511,044 | 4/1985 | Connor et al. | 209/522 |
| 4,517,827 | 5/1985 | Tapscott | 73/49.3 X |
| 4,587,619 | 5/1986 | Converse, III et al. | 73/49.2 X |

FOREIGN PATENT DOCUMENTS

| 2422526 | 11/1975 | Fed. Rep. of Germany | 73/49.3 |
| 59-15832 | 1/1984 | Japan | 73/52 |
| 61-38677 | 2/1986 | Japan | 73/52 |

Primary Examiner—Stewart J. Levy
Assistant Examiner—Joseph W. Roskos
Attorney, Agent, or Firm—John A. O'Toole

[57] ABSTRACT

Disclosed are apparatus and methods for testing for leaks in bottles or containers having at least one flexible portion. The apparatus includes one or more test chambers including a means for applying a direct compressive force to the flexible container portion and also a means for measuring the reaction force exerted by the internal pressure in the container to the applied force after at least two predetermined time intervals following application of the direct force while the force is maintained, and means for generating signals indicative of the reactive forces. In its method aspect, the invention provides methods whereby the reaction force is compared with established reference values obtained by applying the same direct force to an identical container having known leak characteristics and establishing by such comparison if the leak rate for the tested container conforms to the established reference values.

9 Claims, 8 Drawing Sheets

APPARATUS AND METHOD FOR SEAL TESTING FLEXIBLE CONTAINERS

BACKGROUND OF THE INVENTION

1. Technical Field

This invention relates to apparatus and methods for seal or leak testing flexible packages such as plastic bottles.

2. Background Art

The prior art includes a variety of apparatus and methods for detecting defective seals or detecting leaks in containers.

In particular, U.S. Pat. No. 4,587,619 (issued May 6, 1986 to Converse et al.) discloses a complex microprocessor controlled leak detector wherein pressure readings within the container are taken at predetermined time intervals for determining the rate of change of pressure within the container.

The prior art also includes U.S. Pat. No. 4,511,044 (issued Apr. 16, 1985 to Connor et al.) which discloses the use of a force-applying member for securing a seal to a container and a sensor on the force-applying member that generates a signal corresponding to the applied force for use by a discrete logic system or a microprocessor-control system for comparing the force to a reference. This system is readily distinguishable from the invention, particularly in that the resistance of the container itself to an applied force or pressure is not sensed; rather, it is only the force applied to the seal member that is measured.

The prior art also includes several references each directed to detecting leaky packages by applying pressure to a flexible wall of the package and sensing if the internal pressure is capable of resisting the force.

For example, U.S. Pat. No. 4,517,827 issued May 21, 1985 to Tapscott) shows apparatus for conducting testing of multiple containers in a package by inserting probes through openings in the outer package which contact the individual flexible packages within the container to determine their hardness or ability to resist deformation. U.S. Pat. No. 4,148,213 (issued Apr. 10, 1979 to Prakken) simply applies conveyor belt forces to a flexible package and removes soft packages from between the conveyor belts by an air stream. U.S. Pat. No. 4,510,730 (issued Apr. 16, 1985 to Edmondson) compresses a flexible package between pressure members and detects if the pressure members have been closed by more than a predetermined amount, indicative of a fully sealed or non-sealed container.

In U.S. Pat. No. 3,837,215 (issued Sep. 24, 1974 to Massage) a leak rate of a sealed container is determined by placing the container within a sealed test chamber and changing the pressure within the chamber over a time period. A first measurement is taken of a physical dimension of the container at the end of the first time period to produce a first signal and the same physical dimension is again measured at the end of a second time period to produce a second signal indicative of any change of the physical dimension. Any difference between the first and second output signals produces a third signal indicative of a leak rate of the container. The U.S. Pat. No. 3,751,972 (issued Aug. 14, 1975 to Hass) teaches a process and apparatus for batch testing of sealed containers by measuring physical dimensions of the container before and after it has been pressurized. The signal obtained after the container has been pressurized is measured after a predetermined time interval has elapsed after the pressure has been applied to the container.

In German OS No. 2422526 of P. Kallenowski, plastic bottles are compressed between two converging belts. At the point of minimum gap between the belts, a pressure measuring device senses the pressure within the bottles and emits a pulse when a pressure is out of acceptable range. However, it would not appear that a series of pressure readings is taken at predetermined time intervals to determine the general slope of a pressure-time curve characteristic of the ability of a pressurized container to react to an applied load.

Notwithstanding the numerous efforts of the prior art, there remains a continuing need for new and useful apparatus and methods for measuring reliably for the existence of leaks in flexible, sealed containers.

DESCRIPTION OF THE PREFERRED EMBODIMENTS

Figure 1:
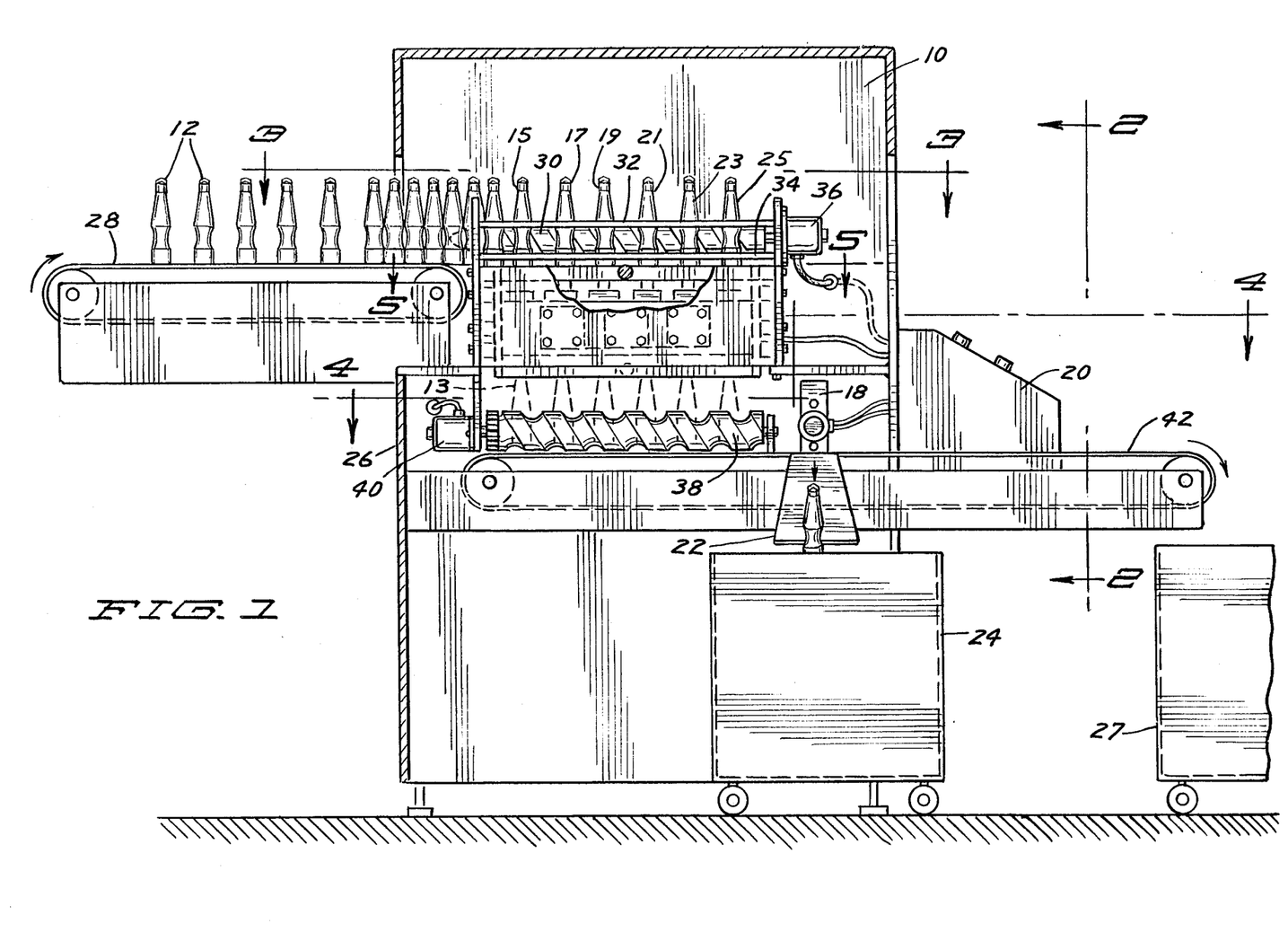
FIG. 1 is a side view of the present apparatus partially cut away and shown in operative relationship with bottle feeding means and bottle take-away means.

Referring now to the drawings, and in particular to FIG. 1, there is shown an apparatus 10 or leak detector for the continous, non-destructive testing for the presence of leaks in hermetically sealed, flexible packages or bottles under either normal pressure or pressurized, e.g., carbonated. Bottles 12 to be leak tested are generally characterized as being flexible on all surfaces or having at least a portion constituted by a flexible wall such as plastic bottles made from high density polyethylene, polyvinyl chloride, etc. The present invention finds particular suitability for use in connection with plastic bottles produced by blow molding.

Generally, bottles 12 to be leak tested are shown in the upper left of FIG. 1 which are received from upstream bottle filling and sealing operations (not shown). The bottles 12 are transported to the right to the leak detector 10 by a means for feeding the bottles into the leak detector 10. A set of six bottles can be seen atop the leak detector 10 awaiting leak testing including bottles individually identified by reference numerals 15, 17, 19, 21, 23 and 25.

The bottles drop by gravity into the leak detector 10 for testing. Portions of a second set of six bottles can be seen in the leak detector being tested.

A third set of bottles 13 is seen below the leak detector 10 after having been tested. After undergoing the testing cycle (described below in detail) the bottles 12 drop onto a means for carrying or taking the bottles 13 away which transport the bottles further to the left past a defective bottle rejector 18. The bottle rejector 18 when activated pushes a defective bottle (not shown) onto an inclined slide 22. The bottle rejector 18 is controlled and activated by a control system 55 (described below) which includes a control panel or, synonomously, operator console 20 shown. The defective bottle then moves down the slide 22 to fall into a bad bottle bin or receptacle 24. As described further below, good bottles pass by the bottle rejector 18 to the next station such as to a good bottle bin 27 as shown or, if desired, to the next downstream operation such as to a bottle label applicator (not shown).

Still referring to FIG. 1, it can be seen that the leak detector 10 is mounted on a stationary frame structure 26 which is conventional in design. As is common in food processing equipment, the apparatus is constructed with stainless steel as much as possible. Also mounted on the frame 26 are the several constituent elements of the bottle feed means which can include a first, upper horizontal endless conveyor or feed conveyor 28 of conventional design adapted to be driven through a suitable power drive (not shown). The feed conveyor 28 advances the to-be-tested bottles 12 to a single power feed screw 30 adapted to engage the bottles 12 to advance the bottles 12 against a pair of upper and lower spaced parallel roll bars 32 and 34. The feed screw 30 is driven by an electric motor 36. The feed screw 30 spaces and aligns the bottles 12 on top of the leak detector 10. The electric motor is in electrical communication as described below with a controller (not shown) through the control panel 20 whereby the screw feed 30 can be cycle controlled. Water can be sprayed intermittently or periodically onto the bottle feed means 16 to lubricate and to wash away any spilled product.

In FIG. 1, it also can be seen that the bottle take-away means can be similar in construction to the above-described feed means or different as shown and can include a matched pair of second or lower power bottle screws 38 and 39 (not shown) also mounted on the frame 26 but positioned below the leak detector 10 and adapted to receive and engage the bottles 12 as they are released from the leak detector 10. The lower bottle screws 38 are driven by a second, lower electric motor 40 conventionally mounted on the frame 26 and which is also electrically connected with the control panel 20. The bottle screws 38 and 39 additionally function to catch and stabilize a group of bottles on a second, lower horizontal endlessly moving take-away conveyor 42 of conventional design and conventionally powered whose speed is synchronized with the advancing action of the screws 38 and 39 such that the bottles are advanced by the screws at the same linear speed as that of the conveyor 42. In other embodiments of the present invention, the inlet feed means can be similar in construction to the described take-away means.

Figure 2:
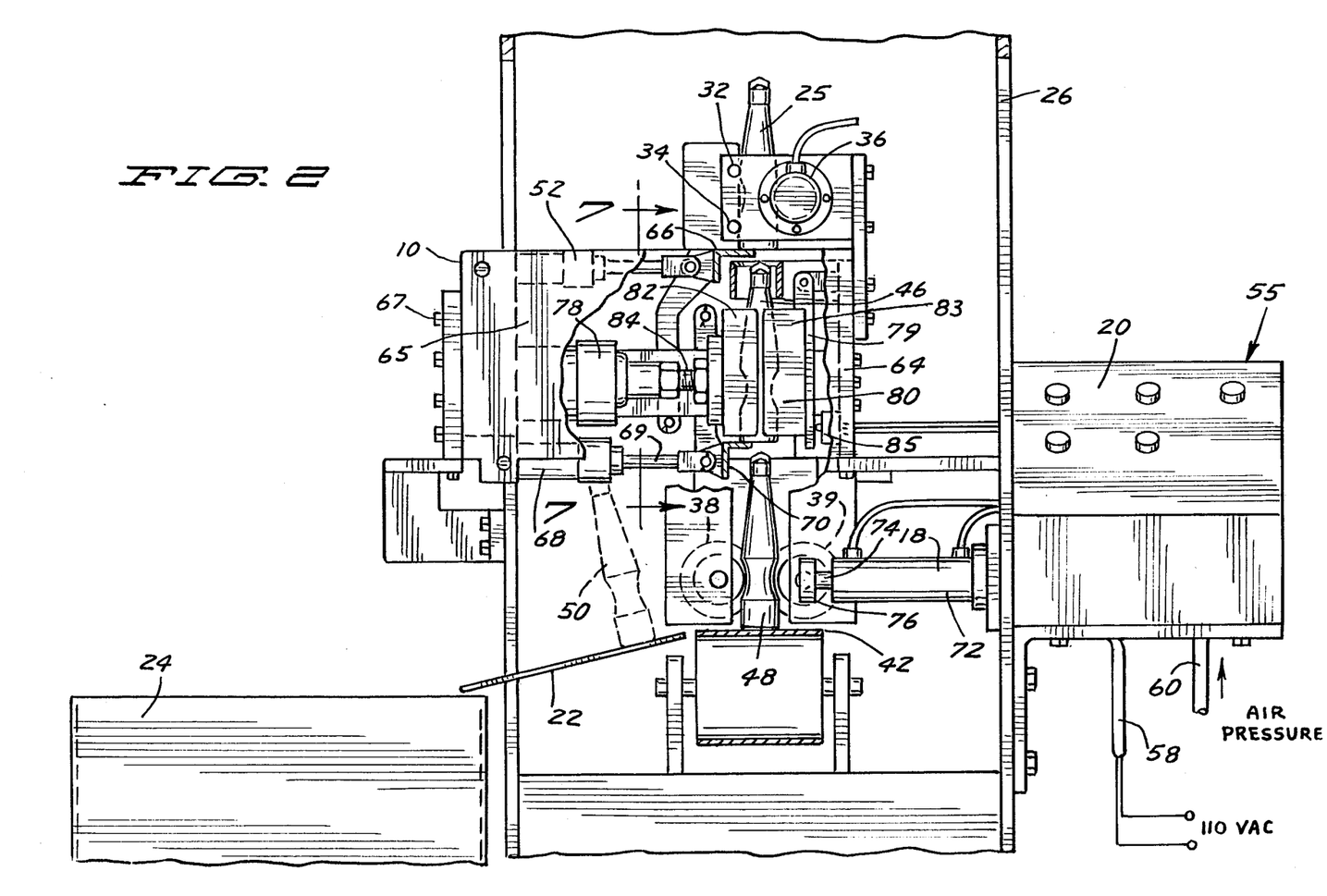
FIG. 2 is an enlarged end sectional view of the apparatus with its end frame partially cut away taken along lines 2—2 of FIG. 1.

Referring now to FIG. 2, it can be seen that the bottle 25 is in position above the leak detector 10 awaiting testing. Bottle 46 is shown in a testing position in the leak detector 10. A bottle designated individually by reference numeral 48 is positioned immediately below the leak detector 10 after having been tested. Bottle 50, shown in relief, is positioned on slide 22 after having been rejected as inadequately or defectively sealed.

Figure 9:
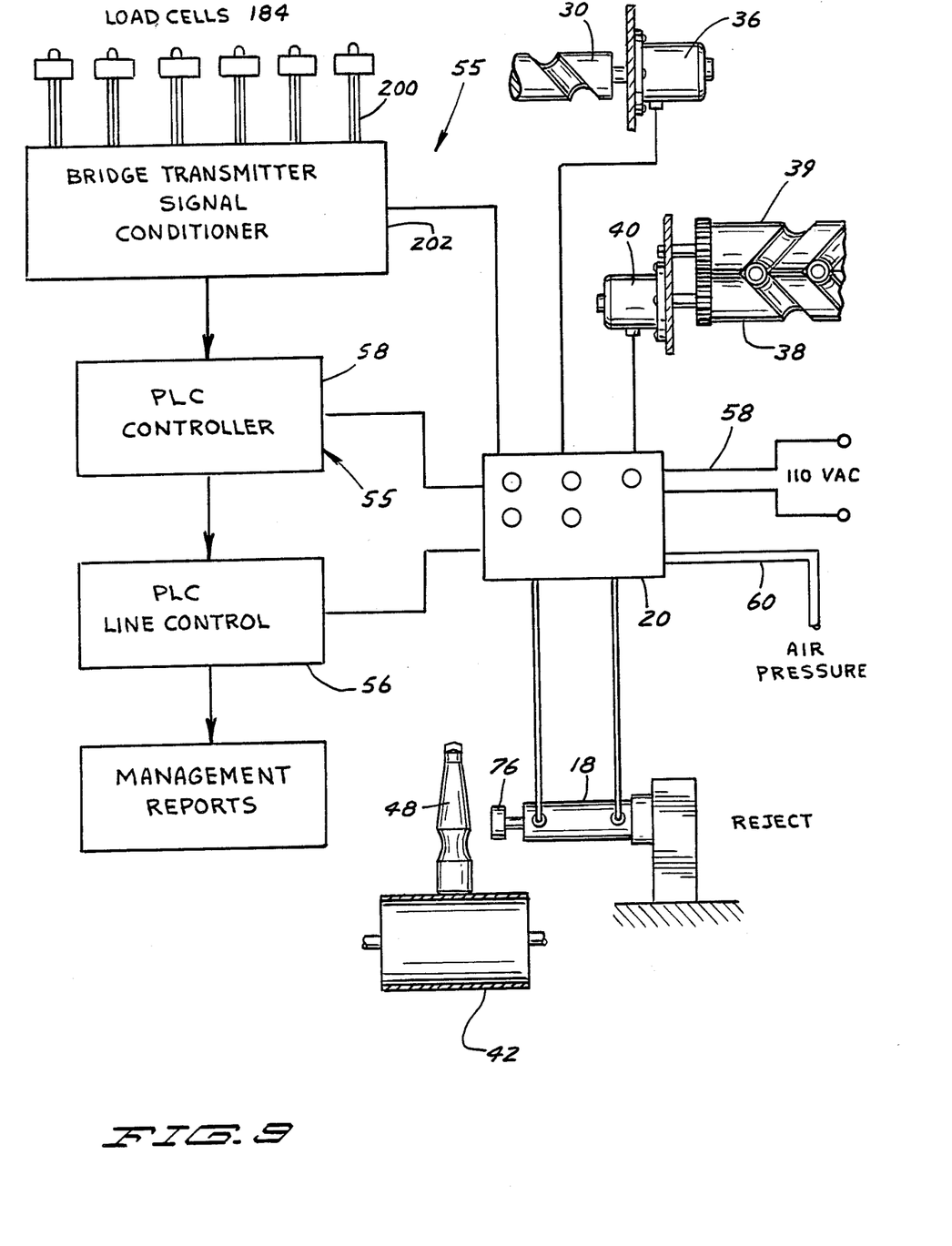
FIG. 9 is a highly schematic diagram of the control system for the present apparatus.

In FIG. 2, it can be seen that the operator console 20 is provided with a plurality of switches. While not critical per se, typical switches can include, for example, a start, stop, reset, bypass, and jog switches (i.e., for minor movement intended to dislodge any containers stuck in the apparatus). Referring briefly now to FIG. 9, it can be seen that the control panel 20 is part of the control system 55 in electrical connection with one or more programmable logic controllers ("PLC") such as a first PLC indicated by reference numeral 56 and a second PLC by 58 which each can be physically part of the control panel 20, mounted on the frame 26 in any convenient location or even distantly located and whose function is described in detail below. PLC's are items of commerce and their specific design, construction and operation are not part of the present invention. PLC's useful herein are available from Allen Bradley, Inc. Referring back to FIG. 2, the control panel 20 is also provided with electrical service 65 and a pressurized air supply 60.

Also in FIG. 2, it can be seen that the leak detector 10 itself includes a means for supporting the individual apparatus elements such as a frame 64 including an end plate 65 which is shown partially cut away. The frame 64 includes means for mounting the leak detector onto the frame 26 including a plurality of threaded bore holes and bolts 67 in conventional manner. One additional element of the inlet feed means is retractable means for supporting the to-be-tested bottles including a first upper double action pneumatic cylinder 52 which is operatively connected to the PLC 56 by means of a conventional solenoid (not shown). The cylinder 52 is pivotably mounted on the frame 64 seen in FIG. 2 and shown in relief. Affixed to the pneumatic cylinder 52 by conventional fastener means is an upper skid plate 66 which provides bottom support to the bottle 25 when the cylinder 52 is in its extended position. Also, the apparatus 10 includes retractable means for supporting bottles during testing including a second, lower double action pneumatic cylinder 68 pivotably mounted on the frame 64 and similarly constructed, operated and controlled as cylinder 52. The pneumatic cylinder 68 has a piston 69 affixed to which is a lower skid plate 70 which provides bottom support to the bottle 46 when in its extended position. Of course, retraction of the pneumatic cylinder 68 will cause the skid plate 70 to move primarily laterally to the left whereby upon removal of its support, the bottle 46 will fall out from the leak detector 10 and through screws 38 and 39 onto the conveyor 42.

FIG. 2 shows that the bottle rejector 18 can comprise still another reciprocating double action pneumatic cylinder 72 mounted on frame 26 and operatively connected to the control system 55. The pneumatic cylinder 72 has a piston 74 onto which is mounted a bumper plate 76.

Also in FIG. 2, it can be seen that the leak detector 10 includes a means for applying a direct force to the bottle 46 being tested which can include a pneumatic cylinder 78 mounted on the frame 64 which is operatively connected to the PLC 56 (not shown) by means of a conventional solenoid (not shown). The force application means can also include inter alia an unsealed or open testing chamber 79 including, in addition to the lower skid plate 70, a two-half contour block assembly set 80 and formed by a matched pair of pieces conforming generally to the shape of the bottles 46, 82 and 83 wherein one piece 82 is mounted on a piston 84 of pneumatic cylinder 78.

Figure 3:
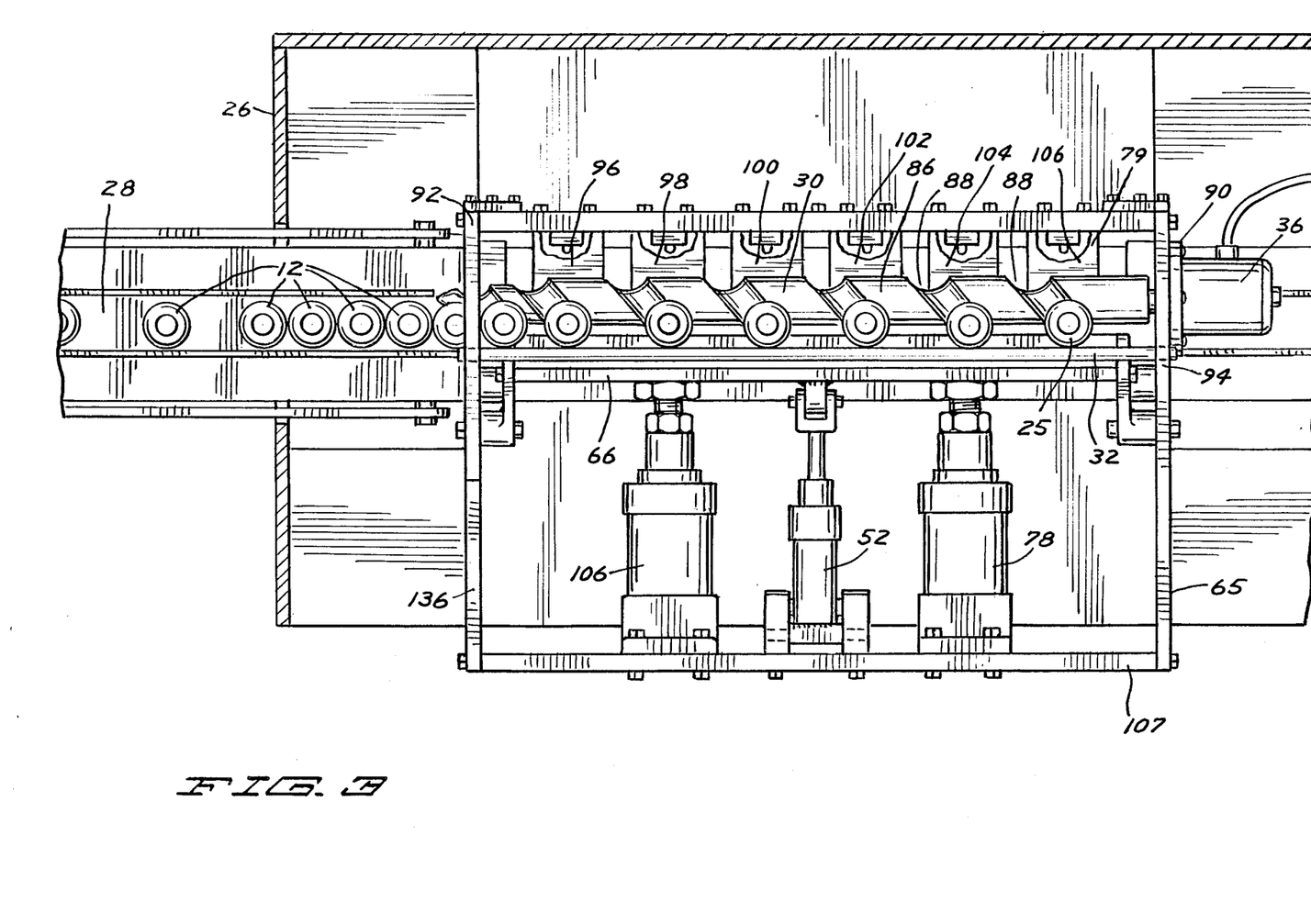
FIG. 3 is an enlarged top sectional view partially cut away taken along lines 3—3 of FIG. 1 showing a plan view of the present apparatus and with the two-half contour block set greatly cut away.

Reference is now made to FIG. 3 which better shows certain features of the feed means 14 including that screw 30 is formed by a rod 86 with a helical grove 88 and that the rod 86 is rotated by gear means 90 operatively connected to the motor 36. The screw 30 is journaled at one end on a plate or frame member 92 and on a plate or frame member 94 at its other end.

FIG. 3 also shows that for commercial scale the leak detector 10 can be designed to test more than one bottle at a time. The specific embodiment depicted is adapted to test as many as six bottles simultaneously although, of course, apparatus can be constructed to test larger or smaller numbers of bottles simultaneously without departing from the spirit of the present invention. Thus, the leak detector 10 can comprise a plurality of testing chambers including those formed in part from contour block assemblies 96, 98, 100, 102 and 104 in addition to testing chamber 79 formed in part from block set 80 described briefly above. As described further below, the first large (e.g., 3.5 inch diameter bore) double action pneumatic cylinder 78 functions to provide direct application force to several block sets, specifically to contour block assemblies 102, 104 and 80 while a second matching pneumatic cylinder 106 also bolted onto a frame end plate 107 provides direct application force to contour block assemblies 96, 98, and 100.

Figure 4:
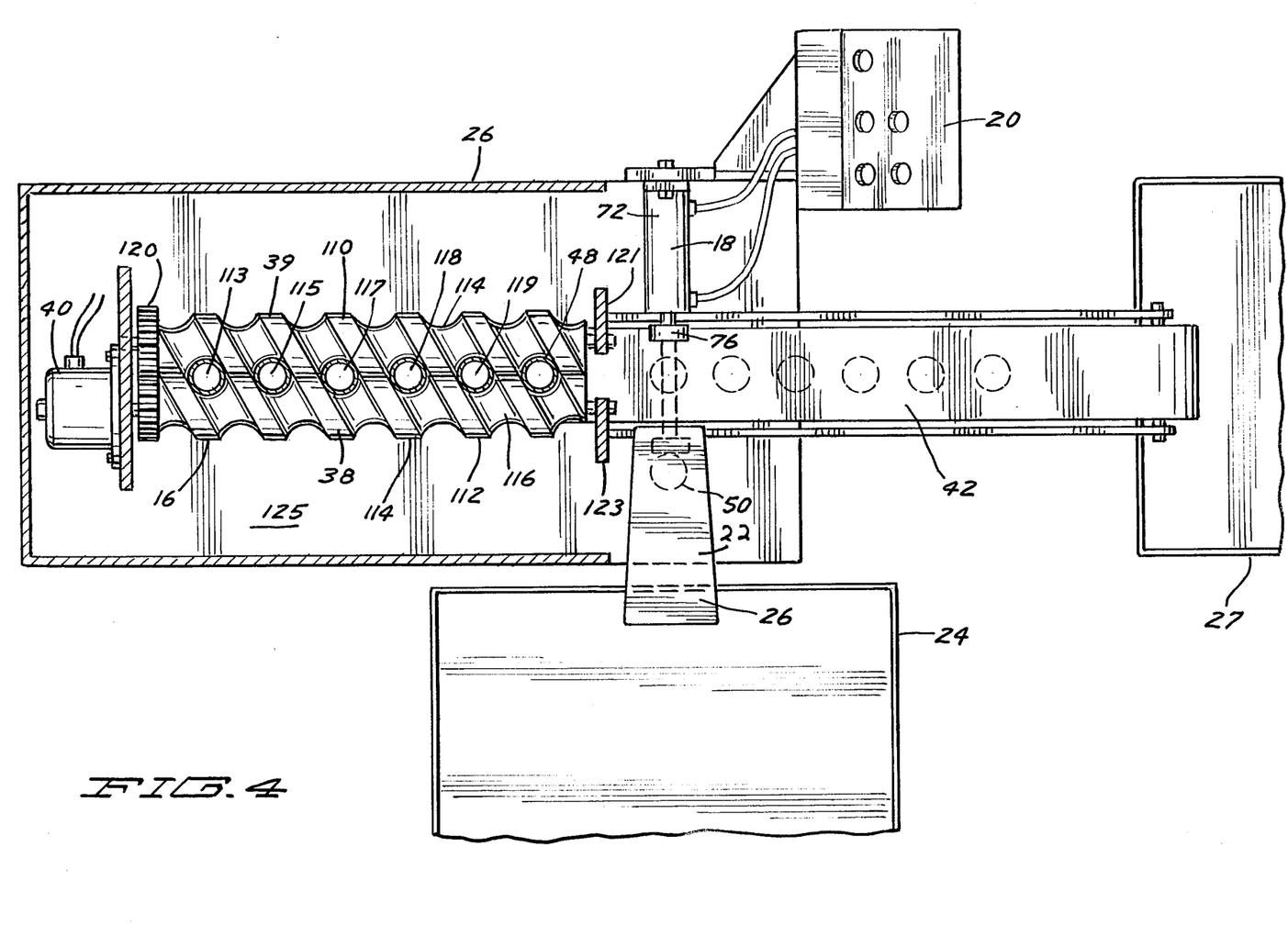
FIG. 4 is an enlarged sectional view taken along lines 4—4 of FIG. 1 showing the take-away conveyor and defective bottle rejection means.

Reference now is made to FIG. 4 which shows the bottle take-away means in more detail. Each screw 38 and 39 can be formed from one of a matched set of rods 110 and 112 each having a helical groove 114 and 116 respectively, aligned with each other, the depth and shape of which groove 114 and 116 are adapted to receive and to engage one or more bottles of the third bottle set 13 such as bottles 113, 115, 117, 118, 119 and 48 upon exiting the leak detector. Each rod 110 and 112 are journaled at one end by drive gear means 120 and at the other by conventional bearings set in support vertical brackets 121 and 123, respectively, which in turn are each affixed, e.g., welded, to frame horizontal plate 125. The screws 38 and 39 function together to catch the bottles directly beneath their individual test chamber and hold the bottles in relative position to each other until the bottles are stable enough to be transported further. The rejector 18 is activated as the bottles are moved past the rejector 18 by the control system 55 (not shown) to extend quickly to push a bad bottle off the conveyor and down the slide 22. As explained further below, the control system 55 will have determined which if any bottle is defective and, simply by timing or by counting the revolutions of the screws, accurately cause the rejector 18 to select the proper bottle for deposit into the bad bottle bin 24 such as bottle 50 shown in relief.

Figure 5:
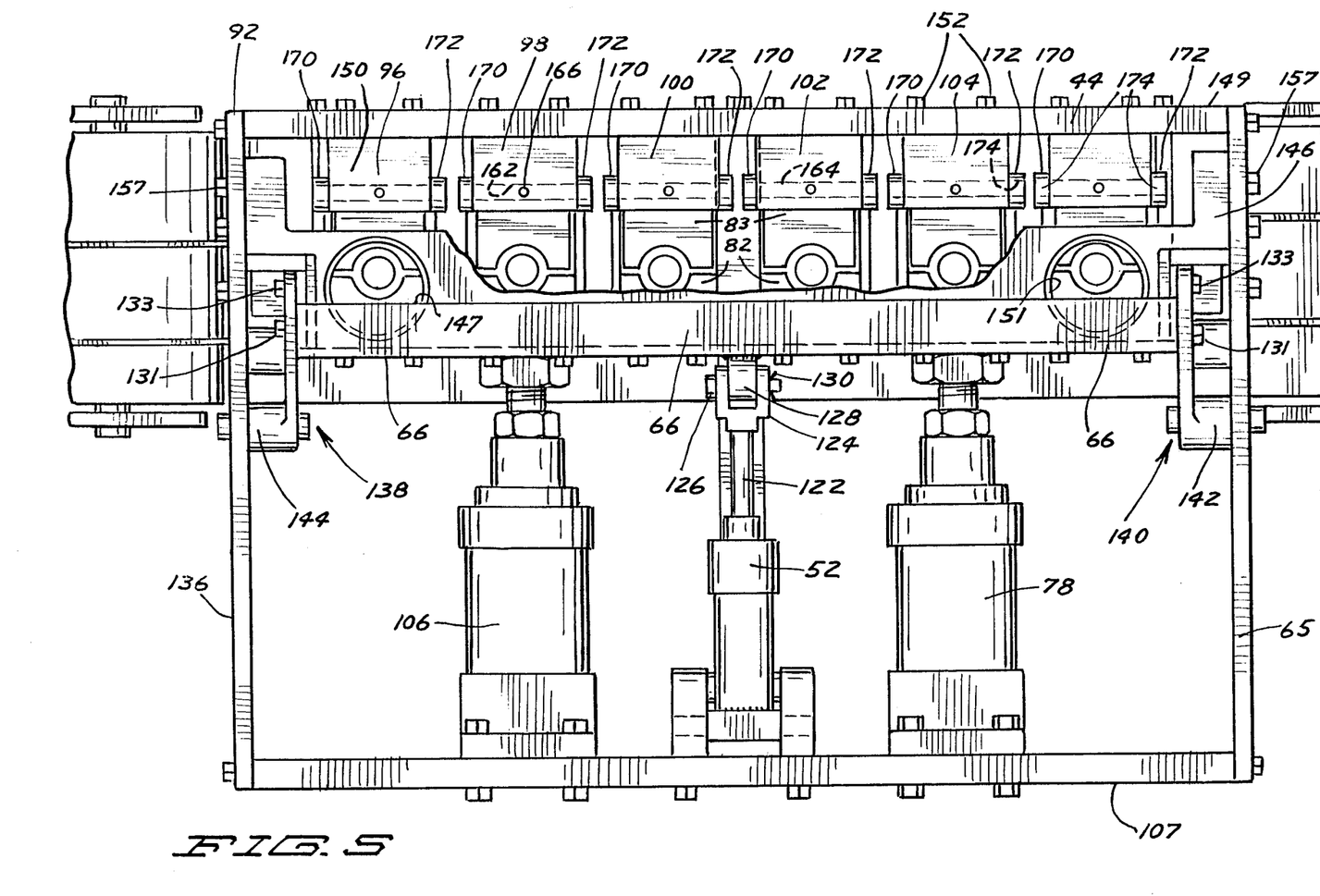
FIG. 5 is an enlarged top sectional view partially cut away showing the apparatus' load leak detection chambers taken along lines 5—5 of FIG. 1.

Referring now to FIG. 5, it can be seen that each upper and lower pneumatic cylinder 52 and 69 (not shown) is similarly pivotably mounted at one end on frame piece 107. It can also be seen that the upper skid plate 66 is pivotably mounted on the other end of upper pneumatic cylinder 52. The cylinder 52 has a piston 122 onto which is screwed or otherwise attached a forked piece or clevis rod 124, a clevis pin 126 therethrough including through a bored circular piece 128 which projects outward from and perpendicular to but is attached, e.g., welded, to the skid plate 66. The pin 126 can be held in place by a cotter pin 130. The lower skid plate (not shown) is mounted with bolts 133 at its opposite ends for pivotable motion on a pair of opposed pivot arms 144 and 142 which are pivotably mounted on frame pieces 65 and 136 respectively with pivot pins 138 and 140. The upper skid plate 66 is comparably mounted and better shown in FIG. 6.

FIG. 5 also shows a stationary bottle drop guide bar 146 partially cut away and attached at one end to frame member 136 and to frame member 65 at its other end, e.g., with bolts 157. Guide bar 146 can be fabricated from a solid piece of aluminum into which are machined a plurality of bores, one for each of the testing chambers, including bores 147 and 151 as shown. The guide bar 146 functions as a means for guiding the drop of bottles into the testing chambers when the upper skid plate 66 is pulled away by retraction of pneumatic cylinder 52.

FIG. 5 also shows that the frame includes an end plate 149 onto which are mounted, e.g., bolted, elements of the contour block assemblies and that the contour block assemblies each further include, a means for converting all force into lateral movement, i.e., parallel to or in the direction of the movement of cylinders 106 and 78, including a plurality of pivot assemblies 148 which includes pivot assembly mounting pieces 151 bolted to frame piece 149 with bolts 152. Through each of the pivot assembly mounting pieces 150 is a bore 162 positioned within which is a pivot pin 164 which is set with a pivot pin set screw 166. The pivot pin serves to react away any torque not in the direction of the cylinder travel. The pivot block assemblies further includes a forked pivot block pressure block 168 (best seen in FIG. 6), the two ends or tines of which 170 and 172 as shown each contain a socket 174 into which pivot pins 164 rest.

Figure 6:
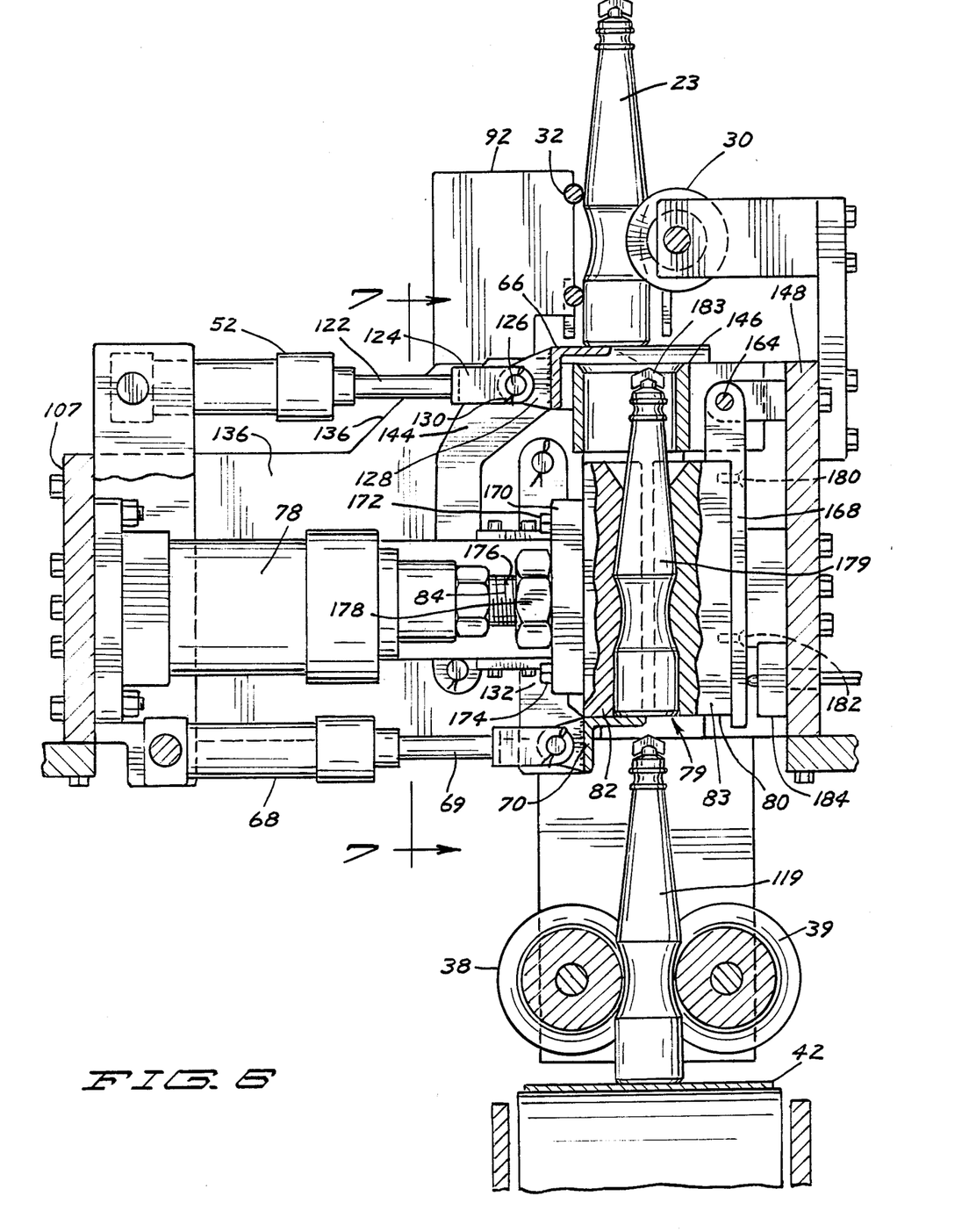
FIG. 6 is a greatly enlarged cross sectional view taken along lines 6—6 of FIG. 7.

FIG. 6 illustrates more clearly the elements of the testing chambers 79 and their operation. Mounted on the piston 84 is a contour block support plate 170 onto which in turn is mounted by conventional means, e.g., employing bolts 172 and 174, one piece 82 which is one of the two halves of the contour block pair pieces. Piston 84 has threading 176 which is screwed into a threaded bore (not shown) in the load cell support plate 170 and the convection is further secured with a jam nut 178. As can be seen, the contour block piece 82 conforms generally to the shape of bottle 179 being tested. Similarly, a contour block piece 83 is mounted onto the pivot block pressure block 168 by conventional means such as screws 180 and 182. The testing chamber 79 can be seen to include further a load cell 184 mounted on frame piece 148.

In operation, as cylinder 78 extends, the contour block piece 82 presses against bottle 179. In turn, the bottle 179 reacts against this direct force and exerts a substantially equivalent force against piece 83 and the pivot block pressure block 168. In turn, a proportional force is transferred from the pivot block pressure block 168 to and for measurement by the pressure sensitive load cell 184. Since the pivot block 168 can only pivot about pivot pin 164, all force at the load cell 184 is converted only into direct one dimensional force for measurement by the load cell 184 for greater accuracy than when torsional or other force components can act upon the load cell 184. Indeed, preferred for use herein are load cells which measure compression loading only. Finally, FIG. 6 shows that the lower skid plate 70 is comparably mounted using a lower pivot arm 132, etc.

Figure 7:
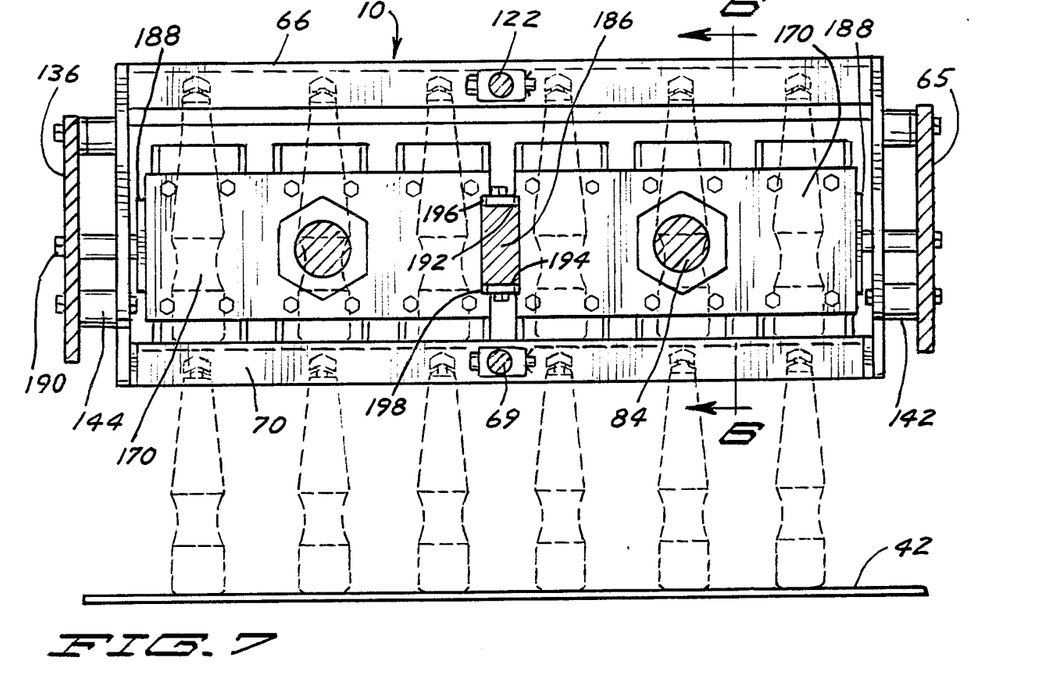
FIG. 7 is a sectional view taken along lines 7—7 of FIG. 2 with the lower screws shown removed.

Reference is now made briefly to FIG. 7 which better shows that the leak detector 10 can further comprise a rectangular frame support or block bar member 186 for additional dimensional stability. As can be seen, each of the contour block support plates 170 is provided with a pair of upper and lower notches 192 and 194 respectively. The combination of notch features and rectangular shape together provide a guide feature to the operation of cylinders 78 and 106 (not shown). In preferred embodiments, the block bar member 186 is fabricated with an upper or header skid plate 196 as well as a lower or sole skid plate 198, each of which can desirably be fabricated from a slick or slippery material such as ultra high molecular weight polyethylene.

Reference is now made to FIG. 9 which shows a highly simplified schematic representation of a preferred embodiment of the control system 55. Force readings or signals are generated by the load cell 184 in response to force exerted by bottles being leak tested as described below. Those signals are transmitted via wires 200 and the signals are then collected and amplified by a bridge transmitter signal conditioner 202 which in turn transmits the signal to the master PLC 58. The control system optionally can further include the second PLC 56 which in the preferred embodiment is an onboard PLC (i.e., onboard the leak detector 10 such as in the operator console 20) which is (1) dedicated to a portion of the control functions; namely to controlling the operation of the leak detector's air cylinders except the reject cylinder, (2) to determine whether a bottle is good or bad, and (3) to communicate with PLC 58 controls all actions, i.e., the electric motors such as motor 36 of the inlet feed means and electric motor 40 of the take-away means. PLC 58 further uses the information received from PLC 56 to decide when to perform all actions. Of course, embodiments can have control systems with only one PLC which controls not only the leak detector operations and functions but also the leak detection measurement and evaluation functions described below. Ultimately, the control system 40 instructs air cylinder 18 to eject bottle 48.

OPERATION

Generally in the embodiment described in detail above and best seen in FIG. 2, six bottles are loaded into the leak detector 10 at a time. The control system 55 activates or controls the retraction of the upper air cylinders 52 and thus withdrawal of the support skid plate 66 causing the bank of bottles to fall by gravity through the apertures of the guide bar 146 into the cells of the leak detector. Thereafter, air cylinders 78 and 106 are activated and extend fully, i.e., to a stationary point forcing closure to the contour block assemblies whereby the bottles are compressed so that a direct force is applied to the flexible wall portion each of the six bottles of approximately 100 pounds initial value. The bottles are compressed to a constant position and their response or reaction is measured. From the moment that the air cylinders start to extend, the main PLC 56 also monitors the reaction force values from each of the six load cells as modified by the bridge transmitter signal conditioner 202 which amplifies the electrical signals received from the load cells. When the PLC 56 detects that a bottle has been encountered, a timer is started.

Figure 8:
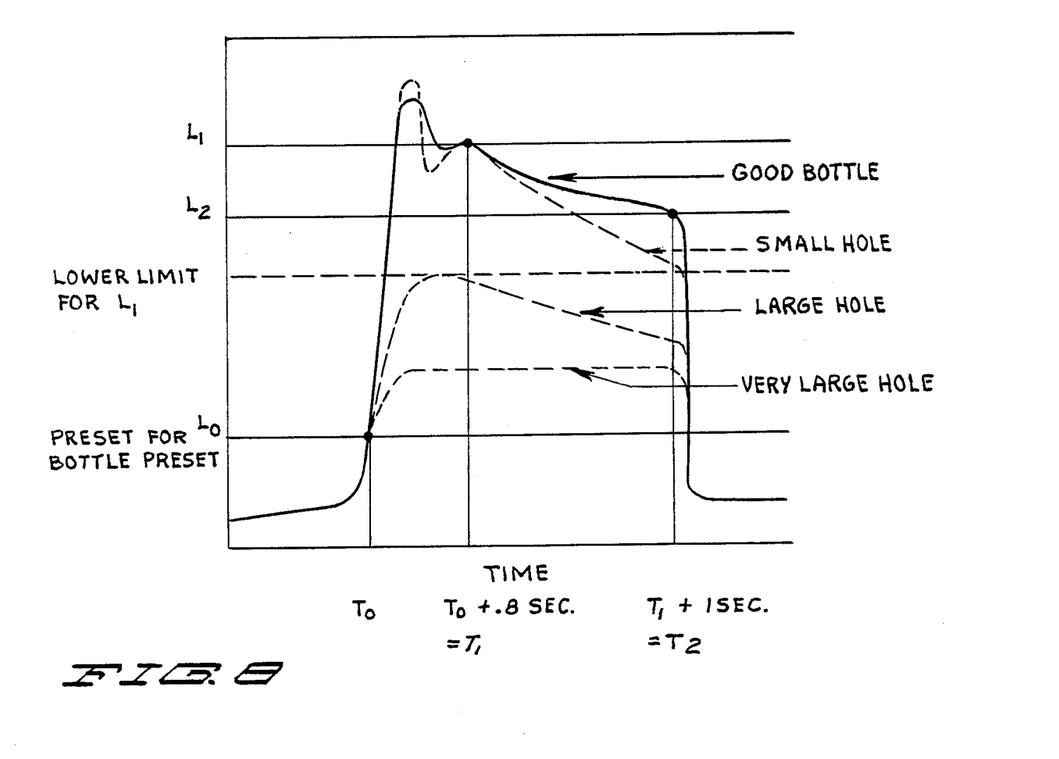
FIG. 8 is a graph of measured internal load over time and showing decay curves for defective bottles with varying hole sizes.

Reference now is made to FIG. 8. The initial time is designated as $T_O$. When this timer reaches a specific later time, e.g., 0.60 to 0.80 seconds or $T_1$, the load cell reading correlated to the reaction force measured (called the "first value" or "$L_1$") is recorded into the PLC 56's memory for each of the six test cells. A specific later time, at time $T_2$ a "second value" or $L_2$ is recorded into memory and the data gathering is complete. The "second value" $L_2$ is compared to or subtracted from the "first value" $L_1$ for each of the six cells and the result is called the "decay." Minimum or "reference" values or lower limits for L, are established based upon identical bottles with known leak characteristics which are intended to catch all leaks larger than approximately 0.008 in. diameter which is considered herein to be a very large hole. Limits are also established for the "decay" values which are intended to catch all leaks between approximately 0.002 in. and 0.012 in. which is considered herein to be a small hole. Even smaller holes can be tested for, although the evaluation time interval must be increased. Also, the likelihood of a good bottle being rejected also increases. Of course, some decay is expected even for acceptable bottles without either large or small holes due to the nature of the bottle. Should any of the $L_0$ readings fall below the lower limits for $L_1$ established, the bottle(s) is thus determined to be defectively sealed, i.e., not sealed. Likewise, should any of the "decay" readings for the bottles being leak tested fall above the limits established, the bottle is determined to be defective even though being sealed but having either a large or small hole.

In some embodiments, the PLC can be programmed such that the comparison is between each container being tested and the running average of test values for the previous thirty non-defective bottles.

When the testing cycle is complete, the PLC 56 notifies the supervisory PLC 106 that the testing cycle is complete and at that time which if any of the six bottles just tested were found to be bad. Then the control system 55 activates the contraction of both the large air cylinders 56 and 107 as well as air cylinder 68. As the lower skid plate 70 is withdrawn from under the bottles in the testing chambers of the leak detector, the six bottles drop out and the entire testing sequence is finished. Thereafter, as the bottles pass by the bottle rejector 18, the control system 55 activates the bottle rejector air cylinder 72 to extend thereby bumping the defective bottle 50 off the take-away conveyor 42. Selection of the defective bottle 50 is done by simple counting of the revolutions or rotations of the take-away screws from activation of the air cylinders 70 releasing the bottles from the leak detector 10.

Thus, generally stated, the principle of operation of the leak detector 10 is to load the bottles up to a nominal force value (about 100 pounds). The applied force of about 100 pounds is coincidental due to how the assembly is constructed. The air cylinders are extended to a set position and locked into place. The confined space defined by the two halves of the contour blocks is slightly smaller than the bottles to be squeezed. So if a bottle is put into that space, it becomes compressed. The reaction by the bottle to the movable half of the contour block is approximately 100 pounds. The reaction of the load cell to the pivoting half is proportional to that (about 65 pounds). The other 35 pounds react at the pivot pin. Then the pressure inside the bottle and its response decay is monitored by observing the value of the reaction at the load cell. Should the level of the first value reading be too low or the level of the decay too great, the bottle is determined to be defective. These two criteria will catch both large and small leaks.

What is claimed is:

1. A process for non-destructive testing of a closed, sealed container, having at least one flexible wall portion to determine the leak rate of the container comprising the steps of:
   a. applying a direct, constant, one dimensional force to the flexible wall portion of the container while locking the container in a stationary position;
   b. measuring the reaction force to the applied force exerted by the internal container pressure after at least first and second intervals of time following application of the force in step (a) while said constant force is applied and wherein said measuring the reaction force includes generating electrical signals representative of said reaction force measurements;
   c. comparing the measurements of said reaction force obtained in step (b) with established reference values for such measurements obtained by applying the same force in the same manner to an identical container having known leak rate characteristics; and
   d. establishing by such compariason if the leak rate for the tested container conforms or does not conform to the established reference values by processing said signals electronically in a programmed microprocessor that includes stored information representative of the established reference values for such measurements.

2. The process of claim 1 wherein the container is fabricated entirely from a flexible material.

3. The method of claim 2 additionally comprising the step of:
   e. modifying the established reference values by substituting therefor averaged values of a predetermined number of measurements of containers.

4. An apparatus for testing closed and sealed containers having an internal pressure and having at least a portion constituted by a flexible plastic wall comprising:
   a. a frame;
   b. means mounted on the frame for applying a direct, constant, one dimensional force to the flexible wall of the container while locking at a compression distance set point to create an increase in the internal pressure;
   c. means mounted on the frame for measuring a reaction force exerted by the increased internal pressure in the container to the applied direct force after at least two predetermined time intervals following application of the direct force while the direct force is maintained;
   d. means mounted on the frame for generating signals indicative of said reaction forces of the increased internal container pressure to the applied force at said time intervals;
   e. means mounted on the frame for feeding to-be-tested containers to the apparatus;
   f. means for transporting tested containers away from the apparatus;
   g. means for discarding defective containers; and
   h. means for electronically controlling the operation of the appartaus.

5. The apparatus of claim 4 wherein the means for electronically controlling the operation of the apparatus includes
   a first programmable logic controller, wherein the means for applying a direct force to the flexible wall of the container includes
   a first double action pneumatic cylinder horizontally and stationarily mounted on the frame and in operative communication with the first controller, said first pneumatic cylinder having a piston,
   a first test chamber, said test chamber including
      an opposed, vertically aligned matched pair of contour pieces conforming genernally to the shape of the container, means for mounting the first contour piece onto the piston of the first pneumatic cylinder and wherein the second piece is pivotably mounted on the frame, and
   wherein the means for measuring the reaction force includes
   a first load cell mounted on the frame in physical contact with the second contour piece, and electrically connected with the first programmable logic controller.

6. The apparatus of claim 5 wherein the means for carrying the containers away from the test chamber is mounted on the frame below the test chamber and includes
   a first lower endless conveyor, and
   wherein the means for discarding the defective containers includes
      a second double action, horizonally aligned pneumatic cylinder mounted on the frame above and perpendicular to the first endless conveyor, said second pneumatic controller being operatively connected to the first programmable logic controller.

7. The apparatus of claim 6
   wherein the means for applying a direct force to the flexible wall of the container further includes
   means mounted on the frme for removably supporting the container while in the test chamber operatively connected to the programmable logic controller,
   wherein the means for feeding to-be-tested containers includes
   a second, upper endless conveyor positioned above the test chamber, and
   means mounted on the frame for removably supporting the to-be-tested container mounted above the test chamber, and operatively connected to the programmable logic controller.

8. The apparatus of claim 7
   wherein the means for removably supporting the container while in the test chamber includes a third, double action, horizontally aligned, pneumatic cylinder pivotably mounted on the frame intermediate the second, upper, endless conveyor and the test chamber on one end and having a piston at its other end, and a first, lower, horizontally aligned support plate bar extending longitudinal and perpendicular to said third pneumatic cylinder and pivotably attached to the piston proximate its middle and an opposed pair of spaced support arms each pivotably mounted to the frame at one end and pivotably mounted at their other end to the support plate bar.

9. The apparatus of claim 8 wherein the load cell measures only compression.

* * * * *